US009429680B2

(12) United States Patent
Grzych et al.

(10) Patent No.: US 9,429,680 B2
(45) Date of Patent: Aug. 30, 2016

(54) ICE CRYSTAL ICING ENGINE EVENT PROBABILITY ESTIMATION APPARATUS, SYSTEM, AND METHOD

(71) Applicant: The Boeing Company, Chicago, IL (US)

(72) Inventors: Matthew L. Grzych, Greeley, CO (US); Jeanne G. Mason, Portland, OR (US); Michael Patnoe, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/454,368

(22) Filed: Aug. 7, 2014

(65) Prior Publication Data
US 2016/0041304 A1 Feb. 11, 2016

(51) Int. Cl.
*G01W 1/10* (2006.01)
*G01W 1/14* (2006.01)
*B64D 47/00* (2006.01)
*G01J 5/00* (2006.01)

(52) U.S. Cl.
CPC ............... *G01W 1/10* (2013.01); *B64D 47/00* (2013.01); *G01J 5/0014* (2013.01); *G01W 1/14* (2013.01)

(58) Field of Classification Search
CPC ....... G01W 1/10; G01W 1/14; G01J 5/0014; B64D 47/00
See application file for complete search history.

(56) References Cited

U.S. PATENT DOCUMENTS

| 4,379,227 | A | 4/1983 | Kovacs | |
|---|---|---|---|---|
| 2013/0014487 | A1* | 1/2013 | Munson, Jr. | ............... F02K 9/62 60/218 |
| 2014/0247163 | A1* | 9/2014 | Kommuri | ............ G08G 5/0013 340/971 |

FOREIGN PATENT DOCUMENTS

| CN | 101865668 B | * 10/2011 |
|---|---|---|
| EP | 2637045 | 9/2013 |
| GB | 2323928 | 10/1998 |

OTHER PUBLICATIONS

Mason, et al., The Challenges Identifying Weather Associated With Jet Engine Ice Crystal Icing, Electronic proceedings, Sae International, 2011-38-0094, published Jun. 13, 2011.
Grzych, et al., Weather Conditions Associated With Jet Engine Power Loss and Damage Due to Ingestion of Ice Particles: What We've Learned Through 2009, American Meteorology Society14th Conference on Aviation, Range, and Aerospace Meteorology, presented Jan. 19, 2010.
European Search Report for EP Application No. 15172655.1 dated Jan. 7, 2016.

\* cited by examiner

*Primary Examiner* — Rodney Butler
(74) *Attorney, Agent, or Firm* — Kunzler Law Group, PC

(57) ABSTRACT

Described herein is an apparatus that includes an estimation module that estimates a probability of an ice crystal icing engine event based on infrared satellite data, numerical weather prediction data, and empirical data corresponding with at least one actual ice crystal icing engine event. The apparatus also includes a data product module that generates a data product that indicates the estimation of the probability of an ice crystal icing engine event. Additionally, the apparatus includes an output module that communicates the data product to a recipient.

20 Claims, 4 Drawing Sheets

ICE CRYSTAL ICING ENGINE EVENT PROBABILITY ESTIMATION APPARATUS, SYSTEM, AND METHOD

FIELD

This disclosure relates generally to determining atmospheric conditions, and more particularly to determining ice water content in the atmosphere and estimating the probability of ice crystal icing engine events.

BACKGROUND

Ice water content in the atmosphere is defined as the concentration of ice particles in the atmosphere. Certain regions of the atmosphere tend to have higher ice water content than other regions.

Regions of the atmosphere with low ice water content may be safer to the flight of aircraft. As an example, high ice water content may be linked to ice crystal icing events within engines of aircraft. Such an ice crystal icing engine event occurs when concentrations of ice particles in the air melt after entering an aircraft engine and refreeze on surfaces of the engine, resulting in an effect on engine operating characteristics. More specifically, an ice crystal icing engine event can be defined as when glaciated or mixed phase cloud particles (e.g., lacking significant amounts of supercooled liquid and airframe icing) are accreted within the engine. Such events inside the engine can cause degradation of the engine.

SUMMARY

The subject matter of the present application has been developed in response to the present state of the art, and in particular, in response to shortcomings of conventional atmospheric ice water determination systems and/or systems for estimating the probability of ice crystal icing engine events. One such shortcoming includes the inability of conventional atmospheric ice water determination systems to accurately determine (e.g., predict) or detect regions of the atmosphere that contain small-particle, high-concentration ice water content or high concentrations of small-particle ice water, and thus regions of the atmosphere that may impose a higher probability of ice crystal icing engine events. Some widely-available weather and atmospheric condition detection systems, such as on-board radar, may be capable of detecting concentrations of ice water with large ice particles. However, such systems do not adequately detect concentrations of ice water with small ice particles.

Many weather and atmospheric condition detection systems cannot rely on empirically-observed data associated with actual ice crystal icing engine events because such events often occur in remote regions of the atmosphere, such as over remote stretches of tropical bodies of water, where empirical observations of weather and atmospheric conditions are unavailable. For example, remote locations of the earth tend to lack ground-based empirical data, such as data from weather radar coverage, weather balloon data, and surface observations. Therefore, general weather patterns or atmospheric conditions that are conducive to the formation of small-particle, high-concentration ice water content are difficult to detect.

The subject matter of the present application has been developed to provide an apparatus, system, and method that overcome at least some of the above-discussed shortcomings of the prior art. More particularly, in some embodiments, described herein is an apparatus, system, and method for determining (e.g., estimating) regions of the atmosphere that potentially contain high concentrations of small-particle ice water and thus present a higher probability of ice crystal icing engine events. In certain implementations, the apparatus, system, and method of the present disclosure does not rely on ice particle data from conventional radar detection systems to estimate the probability of ice crystal icing engine events often caused by regions with small-particle, high-concentration ice water content. Rather, in such implementations, other, more reliable, atmospheric condition data determined to be associated with the formation of small-particle, high concentration ice water content is utilized. Furthermore, although ground-based empirical data may be unavailable, in some implementations, the apparatus, system, and method of the present disclosure utilizes available empirical data (e.g., flight-based empirical data) directly associated with and/or obtained during actual ice crystal icing events in engines of aircraft for estimating the probability of ice crystal icing engine events.

In view of the foregoing improvements over the prior art, in some embodiments, the present disclosure establishes weather patterns or atmospheric conditions for estimating the probability of ice crystal icing engine events (which may be directly or indirectly based on an estimation of small-particle, high-concentration ice water content) on a global scale, and thus determining in near real-time conditions conducive to ice crystal icing events in engines of an aircraft on a global scale. Generally, as established by the present disclosure, the highest probability of ice crystal icing engine events occurs during flight in atmospheric conditions associated with convective cloud weather systems, such as so-called mesoscale convective systems, which are found mainly in warm and moist regions of the atmosphere. Although many variables may affect the formation and evolution of convective cloud weather systems that induce atmospheric regions of high-concentration, small-particle ice water content, it has been found that a combination of only some of the variables (e.g., infrared cloud top temperature data from satellites, precipitable water data, and height-specific temperature data) dominate, and thus only these variables are used to determine potential regions of high probability of ice crystal icing engine events associated with high-concentration, small-particle ice water content on a map.

These regions can represent high probabilities for ice crystal icing engine events, which can be associated with concentrations of small particles (at or just above 100 nm) of ice water greater than about 1 $g/m^3$, with embedded higher concentrations, in certain implementations. Ice crystal icing events within engines (i.e., ice crystal icing engine events) may occur during flight within long stretches (e.g., at least 100 nautical miles) at lower concentrations (e.g., about 1 $g/m^3$) of small-particle ice water content. Alternatively, ice crystal icing engine events may occur during flight within shorter stretches (e.g., much less than 100 nautical miles) at higher concentrations (e.g., greater than about 3 $g/m^3$) of small-particle ice water content. Or finally, ice crystal icing engine events may occur during flight through long stretches of lower concentration ice water content with embedded regions of high ice water content.

Concurrently determining regions around the earth that introduce a high enough probability of ice crystal icing engine events allows aircraft to reroute in flight, or flight route planners to prepare routes in advance, to avoid such regions.

According to one embodiment, an apparatus includes an estimation module that estimates a probability of an ice crystal icing engine event based on infrared satellite data, numerical weather prediction data, and empirical data corresponding with at least one actual ice crystal icing engine event. The apparatus also includes a data product module that generates a data product that indicates an estimation of the probability of an ice crystal icing engine event. Additionally, the apparatus includes an output module that communicates the data product to a recipient.

In some implementations of the apparatus, the infrared satellite data includes infrared brightness temperature of the atmosphere and the numerical weather prediction data includes height-specific temperature of the atmosphere and precipitable water in the atmosphere. The estimation module may execute a comparison between the infrared brightness temperature of the atmosphere, height-specific temperature of the atmosphere, and precipitable water in the atmosphere to respective predetermined thresholds. The estimation module can estimate the probability of an ice crystal icing engine event based on the comparison. The respective predetermined thresholds are based on the empirical data corresponding with actual ice crystal icing engine events in some implementations.

According to certain implementations of the apparatus, the probability of an ice crystal icing engine event is identifiable as one of at least a first ice crystal icing engine event probability and a second ice crystal icing engine event probability. The estimation module estimates the probability of an ice crystal icing engine event as the second ice crystal icing engine event probability if any one of the infrared brightness temperature of the atmosphere, height-specific temperature of the atmosphere, and precipitable water in the atmosphere does not meet a corresponding one of the respective predetermined thresholds. In contrast, the estimation module estimates the probability of an ice crystal icing engine event as the first ice crystal icing engine event probability if all of the infrared brightness temperature of the atmosphere, height-specific temperature of the atmosphere, and precipitable water in the atmosphere meet the respective predetermined thresholds. The first ice crystal icing engine event probability can correspond with a higher probability of an ice crystal icing engine event, and the second ice crystal icing engine event probability can correspond with a lower probability of an ice crystal icing engine event. The predetermined threshold corresponding with the infrared brightness temperature is between about 200 K and about 220 K in some implementations, and is about 209 K in certain implementations. The predetermined threshold corresponding with the height-specific temperature is between about $-20°$ C. at 500 mb and about $0°$ C. at 500 mb in some implementations, and is about $-10°$ C. at 500 mb in certain implementations. The predetermined threshold corresponding with the precipitable water is between about 25 mm and about 45 mm in some implementations, and is about 35 mm in certain implementations.

In some implementations, the estimation module concurrently estimates the probability of an ice crystal icing engine event at a plurality of locations across earth. The comparison can be executed for each of the plurality of locations. The apparatus includes a verification module that verifies the accuracy of the probability of an ice crystal icing engine event based on a physical measurement of at least one condition in the atmosphere in some implementations. According to certain implementations, the estimation module estimates the probability of an ice crystal icing engine event based on a type of engine powering an aircraft capable of flight in the atmosphere.

Furthermore, in some implementations, the data product includes one of an electronic binary data file and an image file.

According to another embodiment, a system includes an aircraft, an estimation module, and an output module. The estimation module estimates a probability of an ice crystal icing engine event based on infrared brightness temperature of the atmosphere, height-specific temperature of the atmosphere, precipitable water in the atmosphere, and empirical data corresponding with at least one actual ice crystal icing engine event. The output module communicates an estimation of the probability of an ice crystal icing engine event to the aircraft. The estimation module estimates the probability of an ice crystal icing engine event based on a type of engine powering the aircraft in some implementations.

In yet another embodiment, a method includes acquiring infrared satellite data and numerical weather prediction data. The method also includes comparing the infrared satellite data and numerical weather prediction data to respective predetermined thresholds. Additionally, the method includes estimating the probability of an ice crystal icing event based on a comparison between the infrared satellite data and numerical weather prediction data to the respective predetermined thresholds.

According to some implementations of the method, the infrared satellite data includes infrared brightness temperature data, and the numerical weather prediction data includes height-specific temperature data and precipitable water data. The method may further include setting the probability of an ice crystal icing event to indicate a higher probability of an ice crystal icing event when each of the infrared brightness temperature data, height-specific temperature data, and precipitable water data meets the respective predetermined thresholds, and setting the probability of an ice crystal icing event to indicate a lower probability of an ice crystal icing event when at least one of the infrared brightness temperature data, height-specific temperature data and precipitable water data does not meet the respective predetermined thresholds. In certain implementations, the infrared brightness temperature data is acquired from a plurality of satellites, and the height-specific temperature data and precipitable water data is acquired from a global numerical weather prediction model.

In some implementations of the method, the ice crystal icing event is an ice crystal icing event on an engine of an aircraft. In yet certain implementations of the method, the ice crystal icing event is an ice crystal icing event on a non-engine component of an aircraft.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter, they are not therefore to be considered to be limiting of its scope. The subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
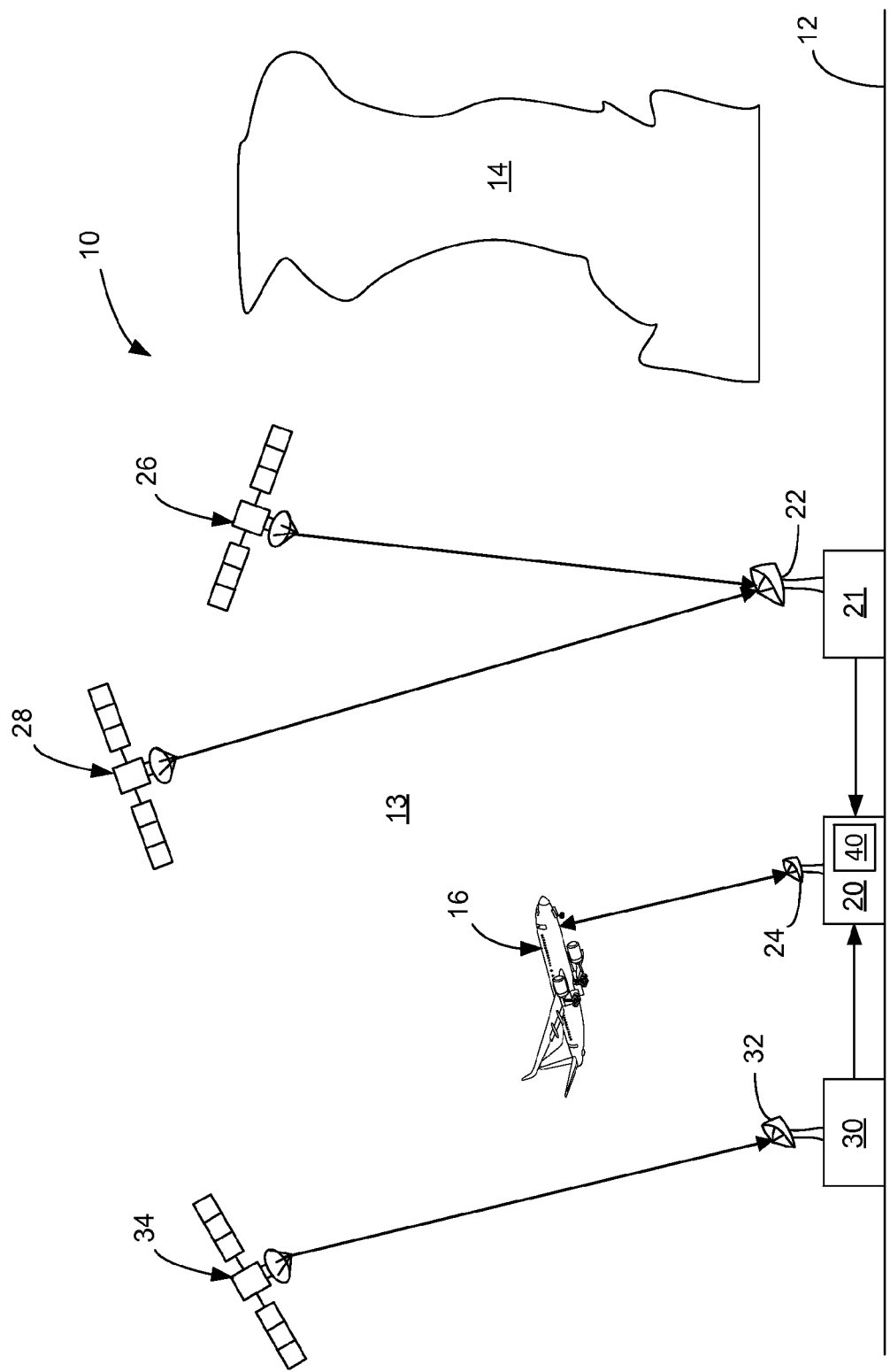
FIG. 1 is a schematic diagram of a system for estimating a probability of ice crystal icing engine events according to one embodiment.

Referring to FIG. 1, and according to one embodiment, a system 10 for estimating a probability of ice crystal icing engine events includes an atmospheric condition analysis station 20. In the illustrated implementation, the atmospheric condition analysis station 20 is positioned and remains on the ground 12. However, in other implementations, the atmospheric condition analysis station 20 can be located on an aircraft, such as aircraft 16, which can be flown in the atmosphere 13 above the ground 12. When separate from the aircraft 16, such as in the illustrated implementation, the atmospheric condition analysis station 20 can communicate information to and receive information from the aircraft via any of various communication signals and techniques, such as via the transceiver 24.

The system 10 also includes a satellite information station 21 on the ground 12 that receives information from at least one satellite, such as at least one of satellites 26, 28. The satellites 26, 28, 34 of the system orbit the earth above the atmosphere 13 and collect data concerning various conditions of the atmosphere 13. According to one implementation, the information collected by the satellites 26, 28 and received by the satellite information station 21 via a receiver 22 includes infrared satellite imagery data. More specifically, the satellites 26, 28 may collect infrared brightness temperature data of the atmosphere 13, and forward that data to the satellite information station 21. Infrared brightness temperature data includes data or imagery, acquired through electromagnetic radiation techniques, representing atmospheric temperatures at the tops of cloud formations. Generally, the colder the temperatures indicated by the infrared brightness temperature data, the higher the cloud formation, and conversely, the warmer the temperatures indicated by the infrared brightness temperature data, the lower the cloud formation. Although two satellites 26, 28 for collecting infrared brightness temperature data are shown, any number of satellites can be used to collect the data. For example, in one implementation, five satellites are used to collect infrared brightness temperature data. Basically, the more satellites used to collect the data, the larger the area of the atmosphere covered by the satellites. Because in some regions of the earth, such as extreme north and south regions, the probability of ice crystal icing engine events is low, the infrared brightness temperature data can be collected from satellites covering only the regions of the earth, such as middle regions of the earth between about 55° S to about 55° N, where the probability of ice crystal icing engine events is higher.

The satellite information station 21 forwards infrared brightness temperature data received from the satellites 26, 28 to the atmospheric condition analysis station 20. According to one implementation, for example, the satellite information station 21 can be associated with Space Science and Engineering Center of the University of Wisconsin-Madison. The infrared brightness temperature data can be communicated to the atmospheric condition analysis station 20 using any of various communication techniques and protocols known in the art. The satellite information station 21 generates an electronic data file containing the infrared brightness temperature data, which is communicated to and processed by the atmospheric condition analysis station 20.

The system 10 can additionally include a global forecast station 30 that generates numerical weather prediction data. The numerical weather prediction data includes information associated with the prediction of one or more atmospheric weather conditions. In some implementations, the numerical weather prediction data includes predictions of the height-specific temperature of the atmosphere and the precipitable water in the atmosphere. The global forecast station 30 can generate the numerical prediction data based on the application of a weather forecast model that receives as input any of various factors. In one implementation, for example, the global forecast station 30 is associated with the National Climatic Data Center of the National Oceanic and Atmospheric Administration (NOAA), and the weather forecast model can be produced by the National Centers for Environmental Prediction. According to certain implementations, at least one factor is based on information received from one or more satellites, such as satellite 34, and collected by a receiver 32. The numerical weather prediction data generated by the global forecast station 30 can be communicated to and processed by the atmospheric condition analysis station 20.

The atmospheric condition analysis station 20 includes an apparatus 40 that estimates a probability of ice crystal icing engine events in at least one region of the atmosphere. The probability estimation can be based at least partially on an estimation or prediction of ice water content in the atmosphere 13, and more specifically, in convective cloud formations 14 in the atmosphere. Generally, the apparatus 40 generates a real-time or near real-time ice crystal icing engine event estimate based on data received from the satellite information station 21 and the global forecast station 30, as well as empirical data corresponding with actual ice crystal icing engine events stored on or accessible by the apparatus. The ice crystal icing engine event estimate can be communicated to the aircraft 16 via the transceiver 24 and used to reroute the aircraft around corresponding regions of high probability, such as convective cloud formations 14, should the estimate be associated with a threshold probability of ice crystal icing events on the engines of the aircraft. Also, in some implementations, as an aircraft 16 is passing through cloud formations associated with an estimated probability of ice crystal icing events that exceed the threshold, information can be communicated to an engine health monitoring unit on the aircraft, other systems of the aircraft, or recipients other than the aircraft for monitoring purposes. Additionally, or alternatively, the ice crystal icing engine event estimate can be communicated to an aircraft flight scheduler or dispatch system to schedule aircraft routes that avoid convective cloud formations 14 associated with a threshold probability of ice crystal icing events on engines of aircraft. Further, avoiding cloud formations associated with the threshold probability of ice crystal icing engine events to reduce the probability of ice crystal icing events in engines also reduces the probability of ice crystal icing events in non-engine components. Moreover, in certain implementations, the apparatus 40 may be configured to estimate probabilities for ice crystal icing non-engine events to avoid cloud formations associated with a threshold probability of ice crystal icing events on non-engine components of aircraft. The modules of the apparatus 40, as will be explained in more detail below, can be executed on a computer machine running any of various operating systems, such as Linux®.

Although the satellite information station 21 and the global forecast station 30 are shown as being physically separate from the atmospheric condition analysis station 20, in some embodiments one or both of the satellite information station and the global forecast station can form part of, or be integrated into, the atmospheric condition analysis station.

Figure 2:
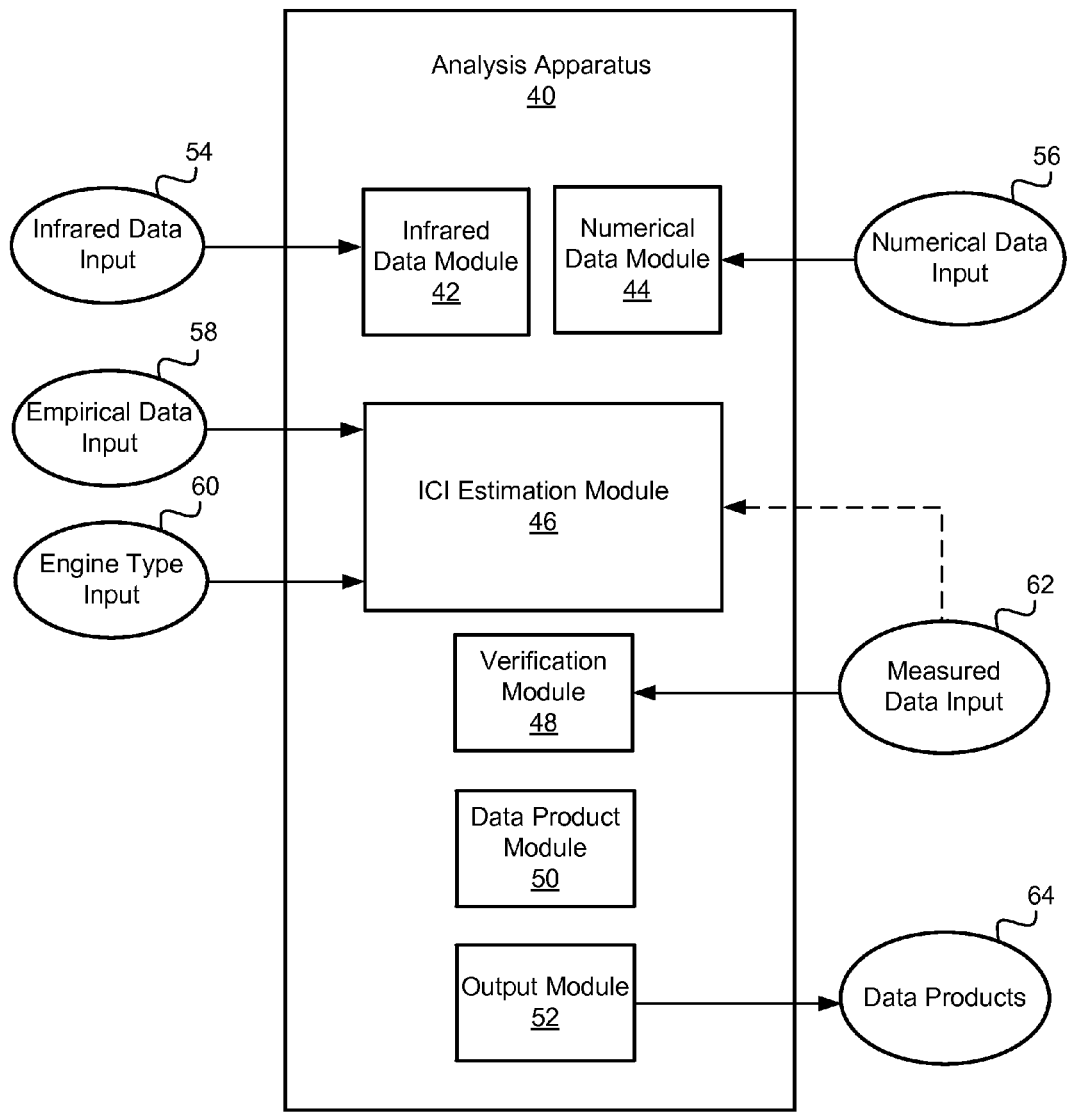
FIG. 2 is a schematic block diagram of an apparatus for estimating a probability of ice crystal icing engine events according to yet another embodiment.

Referring to FIG. 2, according to one embodiment, the apparatus 40 includes an infrared data module 42, a numerical data module 44, an ice crystal icing (ICI) estimation module 46, a verification module 48, a data product module 50, and an output module 52. The infrared data module 42 receives infrared data input 54, and in some implementations converts the infrared data input into a different format. The infrared data input 54 can be data collected from satellites regarding conditions of the atmosphere. In some implementations, the infrared data input 54 includes infrared satellite imagery data. The infrared data module 42 communicates information corresponding with the infrared data input 54 to the ICI estimation module 46.

Similar to the infrared data module 42, the numerical data module 44 receives numerical data input 56, and in some implementations converts the numerical data input into a different format. The numerical data input 56 can be data collected from one or more satellites, and/or other sources, regarding predictions of atmospheric weather conditions. In some implementations, the numerical data input 56 includes predictions of the height-specific temperature of the atmosphere and the precipitable water in the atmosphere. The numerical data input 56 may also include predictions of other atmospheric and weather conditions, such as lifted index and convective available potential energy. The numerical data module 44 communicates information corresponding with the numerical data input 56 to the ICI estimation module 46.

The ICI estimation module 46 receives information regarding the infrared data input 54 and the numerical data input 56, as well as empirical data input 58. Based on the infrared data information, numerical data information, and the empirical data input 58, the ICI estimation module 46 determinations or estimates the probability of ice crystal icing engine events for at least one region in the atmosphere. In some implementations, the ice crystal icing engine event estimate generated by the ICI estimation module 46 can be represented as an estimated probability of ice crystal icing events in engines of aircraft. Alternatively, or additionally, the ice crystal icing engine event estimate generated by the ICI estimation module 46 can be represented as an estimated concentration of small-particle ice water. The ICI estimation module 46 can compare the infrared data input 54 and numerical data input 56 to thresholds. Based on the comparison between the infrared data input 54 and numerical data input 56 and the thresholds, the ICI estimation module 46 estimates the probability of ice crystal icing engine events, which can be based on predicted ice water content, in the atmosphere. The thresholds can be predetermined based on the empirical data input 58, which can be information regarding atmospheric and other conditions empirically obtained during previously-occurring actual ice crystal icing events in engines of aircraft. The information of the empirical data input 58 can be stored in and accessible from a database. Additionally, the thresholds can be predetermined based on engine type input 60, which includes a type of engine powering an aircraft under consideration. For example, when estimating a probability of ice crystal icing events in engines of aircraft, the probabilities for ice crystal icing engine events, and thus the thresholds, may vary based on the type of engine of the aircraft.

The verification module 48 verifies the accuracy of ice crystal icing engine event estimations generated by the ICI estimation module 46. In one implementation, the verification module 48 receives measured data input 62 from a measured data source (not shown). The measured data input 62 may include measurements of conditions of the atmosphere obtained through physical detection means. In one implementation, the measured data input 62 includes measurements of certain conditions of the atmosphere indirectly related to ice crystal icing engine events and/or ice water content in the atmosphere. In yet some implementations, the measured data input 62 may include measurements of conditions directly related to ice crystal icing engine events and/or ice water content in the atmosphere.

According to one embodiment, the measured data input 62 may be used to update the process used by the ICI estimation module 46 for estimating the probability of ice crystal icing engine events in regions of the atmosphere. For example, the thresholds applied by the ICI estimation module 46 to estimate the probability of ice crystal icing engine events may be updated or originally calculated based at least partially on the measured data input 62. The measured data input 62 can include various atmospheric and weather conditions.

The data product module 50 generates a data product based on the ice crystal icing engine event estimation of the ICI estimation module 46. The data product indicates the ice crystal icing engine event estimation and/or the ice water content estimation. In some implementations, the data product is an electronic data file, such as a binary file and/or image file. Accordingly, the data product can provide a numerical and/or visual indication of the ice crystal icing engine event estimation and/or ice water content estimation generated by the ICI estimation module 46.

The output module 52 communicates data products 64 to any of various recipients. The data products 64 may be communicated over any of various data communication lines using any of various communication protocols. For example, the data products 64 may be communicated over the air and/or via landline cables to an aircraft or aircraft dispatch system. The recipients may then utilize the data products 64 to make determinations regarding routing and/or rerouting of aircraft to avoid atmospheric regions where the estimated probability of ice crystal icing engine events meets some threshold probability and/or estimated concentrations of ice water content meet some threshold concentration.

Figure 3:
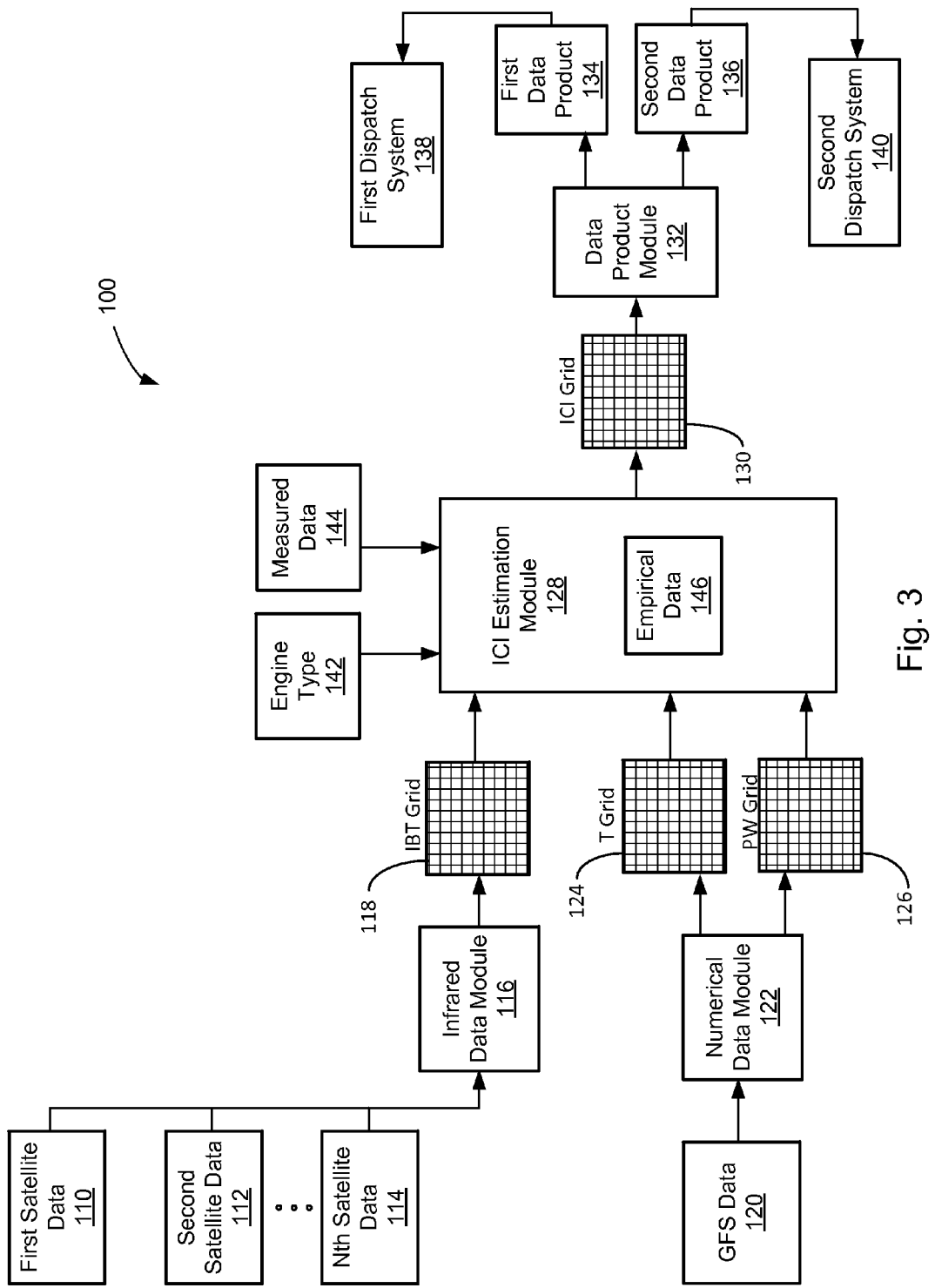
FIG. 3 is a schematic flow diagram of a system for estimating a probability of ice crystal icing engine events according to one embodiment.

Referring to FIG. 3, one embodiment of a system 100 for estimating the probability of ice crystal icing engine events in the atmosphere is shown. The system 100 is analogous to the system 10. Accordingly, the description of the features of the system 10 may apply to the analogous features of the system 100. For example, like the apparatus 40 of system 10, the system 100 includes an infrared data module 116, a numerical data module 122, an ICI estimation module 128, and a data produce module 132, which may operate in a manner similar to the analogous modules of the system 10.

The infrared data module 116 of the system 100 receives satellite data from one or more satellites. For example, as shown, the infrared data module 116 of the illustrated embodiment receives at least first satellite data 110 from a first satellite and second satellite data 112 from a second satellite. However, the infrared data module 116 is equipped to receive satellite data from any number of satellites as indicated by Nth satellite data 114 from an Nth satellite. The satellite data 110, 112, 114 can be infrared satellite imagery data, such as infrared brightness temperature, for respective regions of the atmosphere across the earth. Each satellite obtains infrared satellite imagery data for a different region of the atmosphere such that the combination of infrared satellite imagery data from all the satellites can cover a substantial portion (e.g., nearly all) of the earth. The satellite data 110, 112, 114 can be in any of various formats or electronic data files for processing by the infrared data module 116. In one implementation, the satellite data 110, 112, 114 is in a McIDAS AREA® format and communicated to the infrared data module 116 in a secure environment, such as an Abstract Data Distribution Environment (ADDE).

Depending on the format of the satellite data 110, 112, 114, the infrared data module 116 can convert the satellite data into a different format conducive for importing into a grid file. For example, the infrared data module 116 can include a conversion tool, such as McIDAS-X® software, that converts raw McIDAS AREA files from the satellite data 110, 112, 114 into NetCDF® files (e.g., machine-independent data format that supports the creation, access, and sharing of array-oriented scientific data). The grid file includes infrared satellite imagery data values for a plurality of sections or points forming a geographical grid. In other words, the grid file includes at least one infrared satellite imagery data value for each section or point of a geographical grid. The data values can be represented by binary digits or graphical images. According to one implementation, the grid file includes an infrared brightness temperature value for each section of a geographical infrared brightness temperature (IBT) grid 118 covering the regions covered by the satellite data from the satellites. The IBT grid 118 can have any number of sections, with each section of the IBT grid 118 covering a desired area, such as an 8 km×8 km area. The greater the number of sections, the more detailed the resulting IBT grid 118, and potentially the more accurate the estimation of the probability of ice crystal icing engine events as will be explained in more detail below. In other implementations, each section of the IBT grid 118 can be larger or smaller than 8 km×8 km. Also, the satellite data can be downloaded by or received at the infrared data module 116 at a desired frequency, such as once every hour. In this manner, the IBT grid 118 can be updated according to the desired frequency.

The numerical data module 122 receives numerical weather prediction data from a global forecast station 30. In the illustrated embodiment, the numerical weather prediction data is global forecast system (GFS) data 120 generated by the NOAA. The GFS data 120 can include, among other atmospheric condition data, height-specific temperature data and precipitable water data. Further, the GFS data 120 includes height-specific temperature data values and precipitable water data values for various regions of the atmosphere across the earth. The GFS data 120 can be in any of various formats or electronic data files for processing by the numerical data module 122. In one implementation, the GFS data 120 is in a GRIB2® format, or other similar binary format.

Depending on the format of the GFS data 120, the numerical data module 122 can convert the GFS data into a different format conducive for importing into respective grid files, or extract numerical data from the GFS data for importing into respective grid files. For example, the numerical data module 122 can include an extraction tool, such as a "degrib" Perl® script, that extracts desired numerical data from the GFS data 120. The desired numerical data extracted from the GFS data 120 can include numerical values for height-specific temperature and precipitable water. Accordingly, the grid files include a grid file with height-specific temperature data values, and a grid file with precipitable water data values, for a plurality of sections or points forming a geographical grid. In other words, each of the grid files includes a respective one of at least one height-specific temperature data value and at least one precipitable water data value for each section or point of the respective geographical grid. The data values can be represented by binary digits or graphical images.

According to one implementation, one grid file includes a height-specific temperature data value at a desired height, such as 500 mb (about 18,000 feet above ground), for each section of a temperature (T) grid 124, and another grid file includes a precipitable water data value, such as a size of the precipitable water, for each section of a precipitable water (PW) grid 126. Each of the T grid 124 and PW grid 126 covers the regions covered by the GFS data 120. Additionally, each of the T grid 124 and PW grid 126 can have any number of sections, with each section of the grids covering a desired area, such as an 8 km×8 km area. The greater the number of sections, the more detailed the resulting T grid 124 and PW grid 126, and potentially the more accurate the estimation of the probability of ice crystal icing engine events as will be explained in more detail below. In other implementations, each section of the T grid 124 and PW grid 126 can be larger or smaller than 8 km×8 km. The GFS data 120 can be downloaded by or received at the numerical data module 122 at a desired frequency, such as two times every day. In this manner, the T grid 124 and PW grid 126 can be updated according to the desired frequency.

The IBT grid 118 generated by the infrared data module 116 and the T grid 124 and PW grid 126 generated by the numerical data module 122 are communicated to and received by the ICI estimation module 128. The ICI estimation module 128 utilizes empirical data 146 to determine thresholds associated with each of the grids generated by the infrared data module 116 and numerical data module 122. For example, in the illustrated embodiment, the ICI estimation module 128 determines an infrared brightness temperature threshold associated with the IBT grid 118, a height-specific temperature threshold associated with the T grid 124, and a precipitable water threshold associated with the PW grid 126 based on the empirical data 146. The thresholds associated with each of the grids may also be based on engine type 142 and measured data 144. As shown, in some embodiments, the ICI estimation module 128 receives an engine type 142 and measured data 144, and determines the thresholds based on the engine type and measured data. The empirical data 146 can be physically-obtained data directly associated with and/or obtained during actual ice crystal icing events in engines of aircraft. For example, the empirical data 146 includes empirical measurements of atmospheric conditions or other conditions taken during actual ice crystal icing engine events. In some implementations, the empirical data 146 includes data measurements obtained during at least 150 separate ice crystal icing engine events.

The thresholds determined by the ICI estimation module 128 can be associated with any of various atmospheric conditions, and have any of various values based on any number of factors. In one embodiment, the thresholds determined by the ICI estimation module 128 include the infrared brightness temperature threshold, the height-specific temperature threshold, and the precipitable water threshold. In one implementation, the infrared brightness temperature threshold is about 209 K, and in other implementations, the infrared brightness temperature threshold is between about 200 K and about 220 K. In one implementation, the height-specific temperature threshold is about −10° C. at 500 mb, and in other implementations, the height-specific temperature threshold is between about −20° C. and about 0° C. at 500 mb. According to yet one implementation, the precipitable water threshold is about 35 mm, and in other implementations, the precipitable water threshold is between about 25 mm and 45 mm.

After the thresholds are determined, the ICI estimation module 128 separately compares each value for each section of the grids to the corresponding threshold, and generates an ICI grid 130 based on the results of the comparison. The ICI grid 130 is a geographical grid having sections configured according to the configuration of the sections of the grids generated by the infrared data module 116 and numerical data module 122. More specifically, in some implementations, the ICI grid 130 includes the same number of sections and the same size of sections as the grids generated by the infrared data module 116 and numerical data module 122. In this manner, the ICI grid 130 aligns with the grids generated by the infrared data module 116 and numerical data module 122 such that each section of the ICI grid corresponds with respective sections in the other grids. Accordingly, each section of the ICI grid 130 includes ice crystal icing engine event probability, ice water content, or other similar data values corresponding with the results of the comparisons between the thresholds and data values at the corresponding sections of the grids generated by the infrared data module 116 and numerical data module 122. In some implementations where the grids generated by the infrared data module 116 and numerical data module 122 do not align with (e.g., do not have similarly configured sections as) the ICI grid 130, the ICI estimation module 128 can use extrapolation or interpolation techniques, such as a nearest-neighbor method, to generate the ICI grid 130.

The ICI estimation module 128 creates a blank ICI grid 130 and performs a comparison between the thresholds and data values of the IBT, T, and PW grids for each section of the ICI grid. For example, in one implementation, at each section or point of the blank ICW grid 130, the ICI estimation module compares the infrared brightness temperature value from the same section of the IBT grid 118 to the infrared brightness temperature threshold, compares the height-specific temperature value from the same section of the T grid 124 to the height-specific temperature threshold, and compares the precipitable water value from the same section of the PW grid 126 to the precipitable water threshold. The ICI estimation module 128 then populates each section with the overall result of the comparisons at that section.

The ICI estimation module 128 sets rules for determining the overall result of the comparison. According to some implementations, the ICI estimation module 128 populates each section with a first result if all the thresholds are met, and a second result if not all thresholds are met (e.g., any one of the thresholds is not met). In one implementation, the ICI estimation module 128 populates each section with a first result if all the thresholds are met, a second result if a threshold number (e.g., 2 or more) of thresholds are met, and a third result if the threshold number of thresholds are not met. The section is populated with a value, or other indication, representative of the result. For example, the first result can be represented by a binary number '1' in the section, while the second result can be represented by a binary number '0'. Alternatively, where more than two results are achievable, the results can be represented by one of three or more binary numbers, such as '0', '0.5', and '1'. It is noted that any binary numbering system using any of various values can be used to designate the results of the comparison.

According to one implementation, for each section of the ICI grid 130, the ICI estimation module 128 populates the section with a first value (e.g., 1) if the infrared brightness temperature value from the same section of the IBT grid 118 meets (e.g., exceeds) the infrared brightness temperature threshold, the height-specific temperature value from the same section of the T grid 124 meets (e.g., exceeds) the height-specific temperature threshold, and the precipitable water value from the same section of the PW grid 126 meets (e.g., exceeds) the precipitable water threshold. In contrast, the ICI estimation module 128 populates the section with a second value (e.g., 0) if the infrared brightness temperature value from the same section of the IBT grid 118 does not meet the infrared brightness temperature threshold, the height-specific temperature value from the same section of the T grid 124 does not meet the height-specific temperature threshold, or the precipitable water value from the same section of the PW grid 126 does not meet the precipitable water threshold.

Each result value is associated with an ice crystal icing engine event probability value and/or ice water content value. Accordingly, the ICI grid 130, when populated, provides a numerical representation of the estimation of ice crystal icing engine event probabilities and/or ice water content values at various locations across the globe. Generally, the result value is associated with a higher probability of ice crystal icing engine events or higher ice water content value when all the thresholds are met, and associated with a lower probability of ice crystal icing engine events or lower ice water content value or ice when any one of the thresholds are not met.

To facilitate the viewability, compatibility, or usability of the information in the ICI grid 130, the data product module 132 converts the binary format of the ICI grid into a product module that is more viewable, compatible, or useable than the binary information in the ICI grid 130. In one implementation, the data product module 132 includes a conversion tool, such as GrADS® software, that extracts data from the ICI grid 130 and presents it in a data product having a different format. For example, the data product module 132 may convert the binary designations, such as '1' and '0', from the ICI grid 130 to alphanumeric designations associated with the estimated ice crystal icing engine event probabilities (or ice water content), such as 'high' and 'low'. As another example, the data product module 132 may convert the binary designations, such as '1' and '0', from the ICI grid 130 to color-coded designations associated with the ice crystal icing engine event probabilities (or ice water content), such as a green color for a low probability of ice crystal icing engine events, and a red color for a high probability of ice crystal icing engine events. Although not shown, the values of the ICI grid 130 can be verified as described above before being extracted by the data product module 132.

In the illustrated embodiment, the data product module 132 generates a first data product 134 and a second data product 136. The first data product 134 is communicated to a first dispatch system 138 for processing, and the second data product 136 is communicated to a second dispatch system 140 for processing. According to one implementation, first data product 134 is an image file, such as a .PNG file or .GIF file, or data file, such as an Electronic Flight Folder® file, and the first dispatch system 138 is a computer information delivery and management system, such as MyBoeingFleet®, that enables the transmission of flight information (e.g., rerouting information) to an aircraft. The image file of the first data product 134 may include a depiction of cloud movement based on the storage of ice crystal icing engine event probability estimations over time. Additionally, the image files may have planned aircraft route overlays.

In yet one implementation, the second data product 136 is a concise data format file, such as a GRIB2 file, and the second dispatch system 140 is an aircraft fleet management and routing system, such as provided by Jeppesen®. Although two data products and two dispatch systems are shown, in other embodiments, any number of data products can be communicated and processed by any number of dispatch systems, or other systems to which the information in the data products may be useful.

Figure 4:
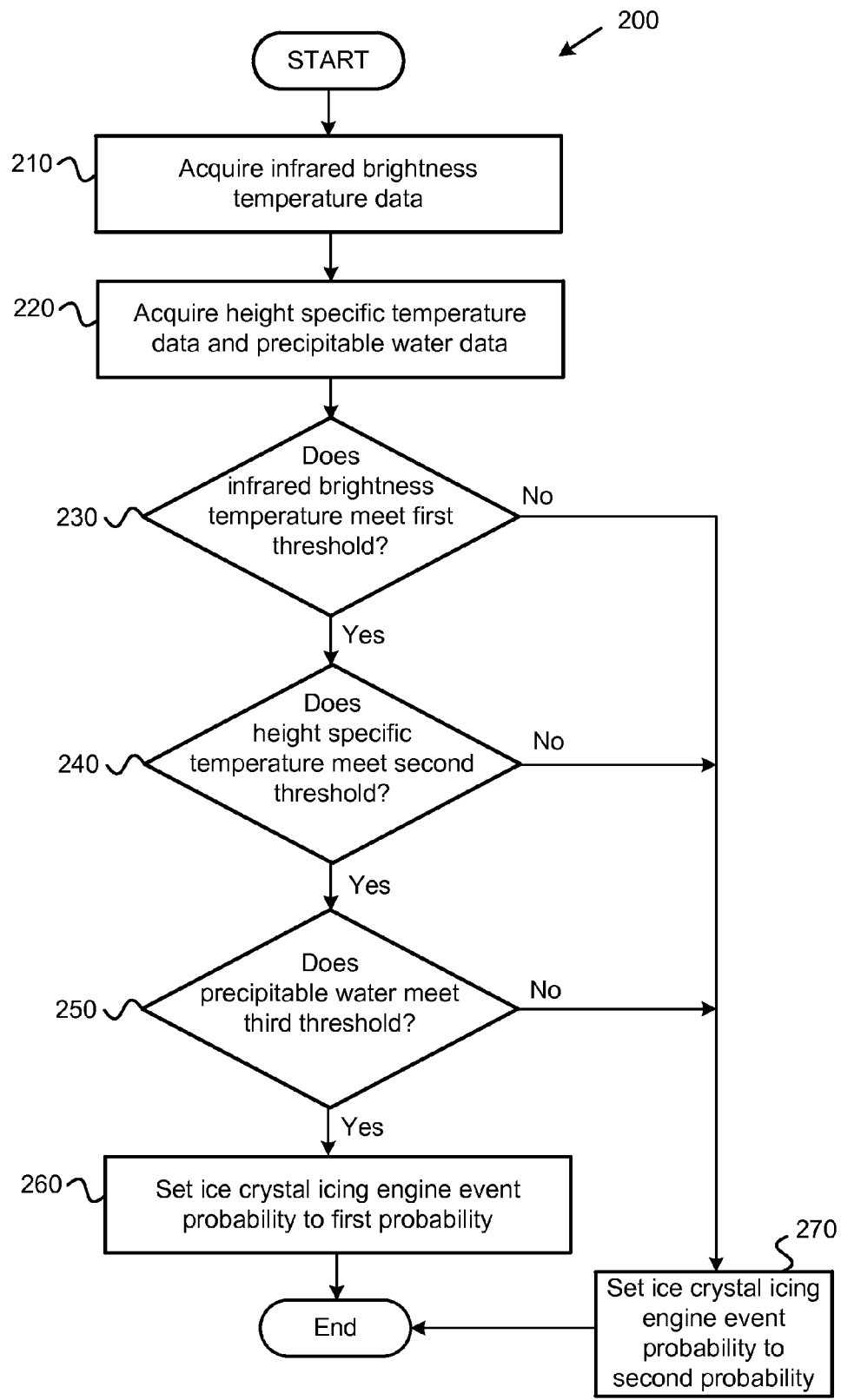
FIG. 4 is a schematic flow diagram of a method for estimating a probability of ice crystal icing engine events according to one embodiment.

Referring to FIG. 4, a method 200 for estimating the probability of ice crystal icing engine events for aircraft flying through the atmosphere, or correspondingly ice water content in the atmosphere, is shown. The method 200 includes acquiring infrared satellite data, such as infrared brightness temperature data, at 210. Additionally, the method 200 includes acquiring numerical weather prediction data, such as height-specific temperature data and precipitable water data, at 220. In some implementations, the infrared satellite data is acquired from a plurality of satellites and the numerical weather prediction data is acquired from a global numerical weather prediction model.

The method 200 includes determining whether the infrared brightness temperature or other infrared brightness temperature data meets a first threshold at 230. If the determination at 230 is positive, the method 200 proceeds to determine if a first condition of the numerical weather prediction data, such as a height-specific temperature, meets a second threshold at 240. If the determination at 240 is positive, the method 200 determines if a second condition of the numerical weather prediction data, such as precipitable water, meets a third threshold at 250. If the determination at 250 is positive, the method 200 proceeds to set an estimation of the probability of an ice crystal icing engine event to a first probability, such as high, at 260 and the method ends. However, if any of the determinations at 230, 240, 250 is negative, the method 200 proceeds to set an estimation of the probability of an ice crystal icing engine event to a second probability, such as low, at 270 and the method ends. In an alternative embodiment, the method 200 may set an ice water content status to a first status, such as high, at 260, and set the ice water content status to a second status, such as low, at 270.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages (e.g., LabVIEW). The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. An apparatus, comprising:
    an estimation module that estimates a probability of an ice crystal icing engine event based on infrared satellite data, numerical weather prediction data, and empirical data corresponding with actual ice crystal icing engine events;

a data product module that generates an electronic data file indicating the estimation of the probability of an ice crystal icing engine event; and an output module that communicates the electronic data file over an electronic data communication line to at least one aircraft-monitoring recipient;

wherein the infrared satellite data comprises infrared brightness temperature of atmosphere, and the numerical weather prediction data comprises height-specific temperature of atmosphere and precipitable water in atmosphere; and wherein the estimation module executes a comparison between the infrared brightness temperature of atmosphere, height-specific temperature of atmosphere, and precipitable water in atmosphere to respective predetermined thresholds, and wherein the estimation module estimates the probability of an ice crystal icing engine event based on the comparison.

2. The apparatus of claim 1, wherein the respective predetermined thresholds are based on the empirical data corresponding with actual ice crystal icing engine events.

3. The apparatus of claim 1, wherein the probability of an ice crystal icing engine event is identifiable as one of at least a first ice crystal icing engine event probability and a second ice crystal icing engine event probability, and wherein the estimation module estimates the probability of an ice crystal icing engine event as the second ice crystal icing engine event probability if any one of the infrared brightness temperature of atmosphere, height-specific temperature of atmosphere, and precipitable water in atmosphere does not meet a corresponding one of the respective predetermined thresholds, and estimates the probability of an ice crystal icing engine event as the first ice crystal icing engine event probability if all of the infrared brightness temperature of atmosphere, height-specific temperature of atmosphere, and precipitable water in atmosphere meet the respective predetermined thresholds.

4. The apparatus of claim 3, wherein the first ice crystal icing engine event probability corresponds with a higher probability of an ice crystal icing engine event, and the second ice crystal icing engine event probability corresponds with a lower probability of an ice crystal icing engine event.

5. The apparatus of claim 3, wherein the predetermined threshold corresponding with the infrared brightness temperature is between about 200 K and about 220 K.

6. The apparatus of claim 5, wherein the predetermined threshold corresponding with the infrared brightness temperature is about 209 K.

7. The apparatus of claim 3, wherein the predetermined threshold corresponding with the height-specific temperature is between about −20° C. at 500 mb and about 0° C. at 500 mb.

8. The apparatus of claim 7, wherein the predetermined threshold corresponding with the height-specific temperature is about −10° C. at 500 mb.

9. The apparatus of claim 3, wherein the predetermined threshold corresponding with the precipitable water is between about 25 mm and about 45 mm.

10. The apparatus of claim 9, wherein the predetermined threshold corresponding with the precipitable water is about 35 mm.

11. The apparatus of claim 1, wherein the estimation module concurrently estimates the probability of an ice crystal icing engine event at a plurality of locations across earth.

12. The apparatus of claim 1, further comprising a verification module that verifies accuracy of the probability of an ice crystal icing engine event based on a physical measurement of at least one condition in atmosphere.

13. The apparatus of claim 1, wherein the estimation module estimates the probability of an ice crystal icing engine event based on a type of engine powering an aircraft capable of flight in the atmosphere.

14. The apparatus of claim 1, wherein the data product comprises one of an electronic binary data file and an image file.

15. A system, comprising:
an aircraft;
an estimation module that estimates a probability of an ice crystal icing engine event based on infrared brightness temperature of atmosphere, height-specific temperature of atmosphere, precipitable water in atmosphere, and empirical data corresponding with at least one actual ice crystal icing engine event; and
an output module that communicates the estimation of the probability of an ice crystal icing engine event to the aircraft;
wherein the estimation module executes a comparison between the infrared brightness temperature of atmosphere, height-specific temperature of atmosphere, and precipitable water in atmosphere to respective predetermined thresholds, and wherein the estimation module estimates the probability of an ice crystal icing engine event based on the comparison.

16. The system of claim 15, wherein the estimation module estimates the probability of an ice crystal icing engine event based on a type of engine powering the aircraft.

17. A method, comprising:
acquiring infrared satellite data and numerical weather prediction data;
comparing the infrared satellite data and numerical weather prediction data to respective predetermined thresholds, wherein the infrared satellite data comprises infrared brightness temperature data, and the numerical weather prediction data comprises height-specific temperature data and precipitable water data;
estimating a probability of an ice crystal icing event based on a comparison between the infrared satellite data and numerical weather prediction data to the respective predetermined thresholds;
setting the probability of an ice crystal icing event to indicate a higher probability of an ice crystal icing event when each of the infrared brightness temperature data, height-specific temperature data, and precipitable water data meets the respective predetermined thresholds, and setting the probability of an ice crystal icing event to indicate a lower probability of an ice crystal icing event when at least one of the infrared brightness temperature data, height-specific temperature data and precipitable water data does not meet the respective predetermined thresholds;
converting the probability of an ice crystal icing event into an electronic data file; and
communicating the electronic data file to at least one aircraft-monitoring recipient over an electronic data communication line.

18. The method of claim 17, wherein the infrared brightness temperature data is acquired from a plurality of satellites, and the height-specific temperature data and precipitable water data is acquired from a global numerical weather prediction model.

19. The method of claim 17, wherein the ice crystal icing event comprises an ice crystal icing event on an engine of an aircraft.

20. The method of claim 17, wherein the ice crystal icing event comprises an ice crystal icing event on a non-engine component of an aircraft.

* * * * *